United States Patent [19]

Baynes et al.

[11] Patent Number: 4,509,619
[45] Date of Patent: Apr. 9, 1985

[54] SHOE MOUNTED DISC BRAKE CALIPER AND SHOE SUPPORT STRUCTURE

[75] Inventors: Gene P. Baynes, Kettering; Wolfgang Melinat, Dayton, both of Ohio

[73] Assignee: General Motors Corporation, Detroit, Mich.

[21] Appl. No.: 389,428

[22] Filed: Jun. 17, 1982

[51] Int. Cl.³ ............................................. F16D 55/18
[52] U.S. Cl. .............................. 188/73.39; 188/73.38; 188/73.43
[58] Field of Search .............. 188/73.31, 73.38, 73.39, 188/73.43, 73.44, 73.45, 73.1, 72.5, 73.47

[56] References Cited

U.S. PATENT DOCUMENTS

| | | | |
|---|---|---|---|
| 3,298,468 | 1/1967 | Buyze | 188/73.45 |
| 3,403,756 | 10/1968 | Thirion | 188/73.43 |
| 3,612,226 | 10/1969 | Pauwels | 188/73.43 |
| 3,889,785 | 6/1975 | Hori | 188/73.45 |
| 4,321,984 | 3/1982 | Burgdorf et al. | 188/73.39 |
| 4,335,806 | 6/1982 | Lupertz | 188/73.39 |

FOREIGN PATENT DOCUMENTS

| | | | |
|---|---|---|---|
| 1286845 | 1/1909 | Fed. Rep. of Germany | 188/73.31 |
| 1548220 | 7/1979 | United Kingdom | 188/73.38 |

Primary Examiner—Bruce H. Stoner, Jr.
Assistant Examiner—Alvin Oberley
Attorney, Agent, or Firm—D. D. McGraw

[57] ABSTRACT

The disc brake caliper housing is fully mounted on, supported and retained by the brake shoes of the brake pad assemblies. All brake torque forces are transmitted from the shoes to the fixed mounting bracket. The caliper housing is subjected only to axially clamping forces. In one embodiment no bolts or pins are required to support the caliper assembly, including the brake pad assemblies, on the mounting bracket. In another embodiment an uncomplicated roll pin arrangement supports and retains the shoes and the caliper housing on the mounting bracket.

2 Claims, 8 Drawing Figures

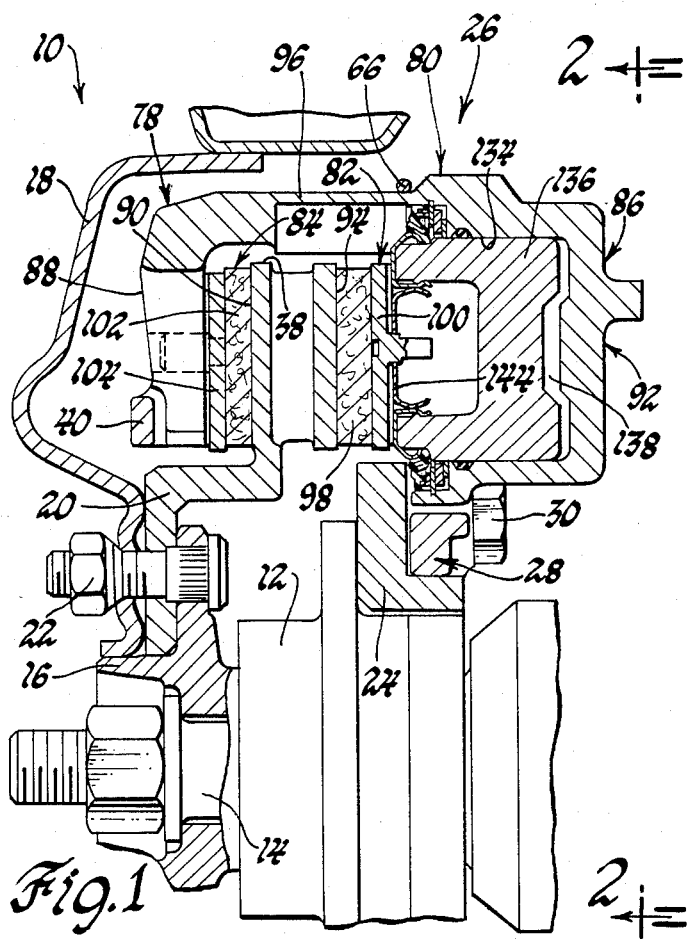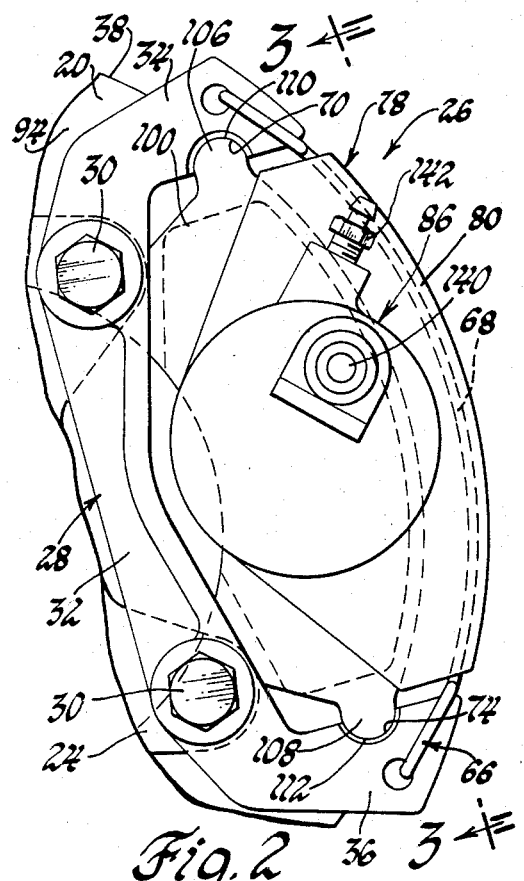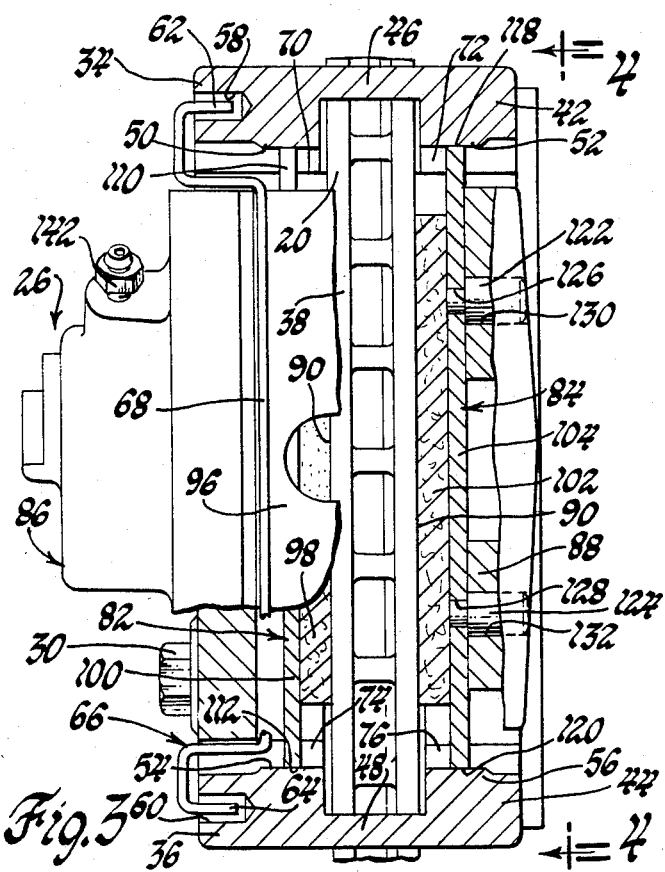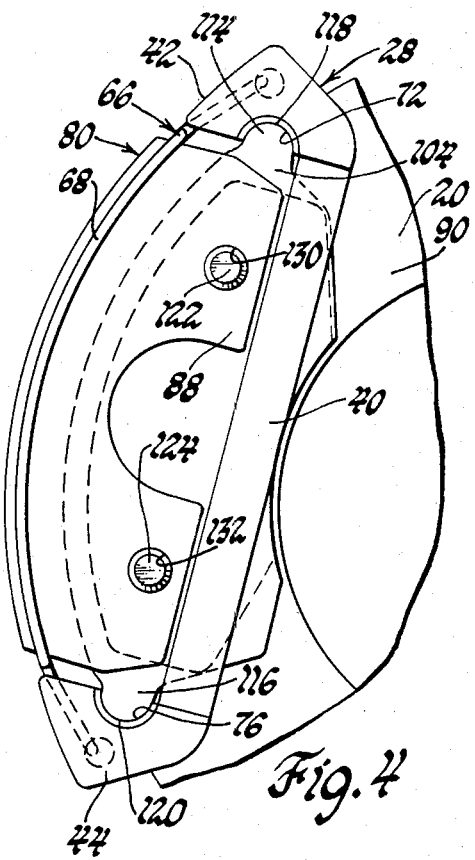
Fig.1
Fig.2
Fig.3
Fig.4

SHOE MOUNTED DISC BRAKE CALIPER AND SHOE SUPPORT STRUCTURE

The invention relates to a disc brake caliper having the inboard and outboard brake pad assemblies separated from the caliper housing so as to redirect the flow of all frictional forces from between the brake linings and the disc directly into the mounting support through a mounting bracket. This separation of forces eliminates all twisting movements from the caliper housing, and does not require the caliper housing to carry any of the frictionally generated forces. The caliper housing can then be made of light weight material such as aluminum and at the same time can keep deflections and brinelling of the caliper housing by the brake shoes to an absolute minimum.

The invention herein disclosed and claimed mounts and confines the inboard and outboard brake pad assemblies for axially slidable movements inside a mounting bracket. Considering the brake assembly to be on the front wheel of a vehicle, the mounting bracket is attached to the steering knuckle. When on non-steerable wheels, a different mounting structure would provide for securing the mounting bracket to a relatively fixed portion of the vehicle. The caliper assembly is located on and supported by the brake shoes. In one embodiment the shoes are nested slidably in the mounting bracket with an arrangement which lock the shoes against all movements other than slidable movements toward and away from the friction braking surfaces of the disc, using no bolts or pins to support the shoes. A suitable anti-rattle spring minimizes rattle noise. The other embodiment discloses a similar arrangement, but uses pins to lock the brake shoes against movements other than the axial sliding movements toward and away from the friction surfaces of the disc.

IN THE DRAWINGS

FIG. 1 is a cross-section view, with parts broken away, of a vehicle wheel and brake assembly embodying the invention.

FIG. 2 is an elevation view of the structure of FIG. 1, with parts broken away, and taken in the direction of arrows 2—2 of that Figure.

FIG. 3 is a plan view, with parts broken away and in section, of the structure of FIGS. 1 and 2 and taken in the direction of arrows 3—3 of FIG. 2.

FIG. 4 is an elevation view of the structure of FIGS. 1 through 3, with parts broken away, and taken in the direction of arrows 4—4 of FIG. 3.

Figure 5:
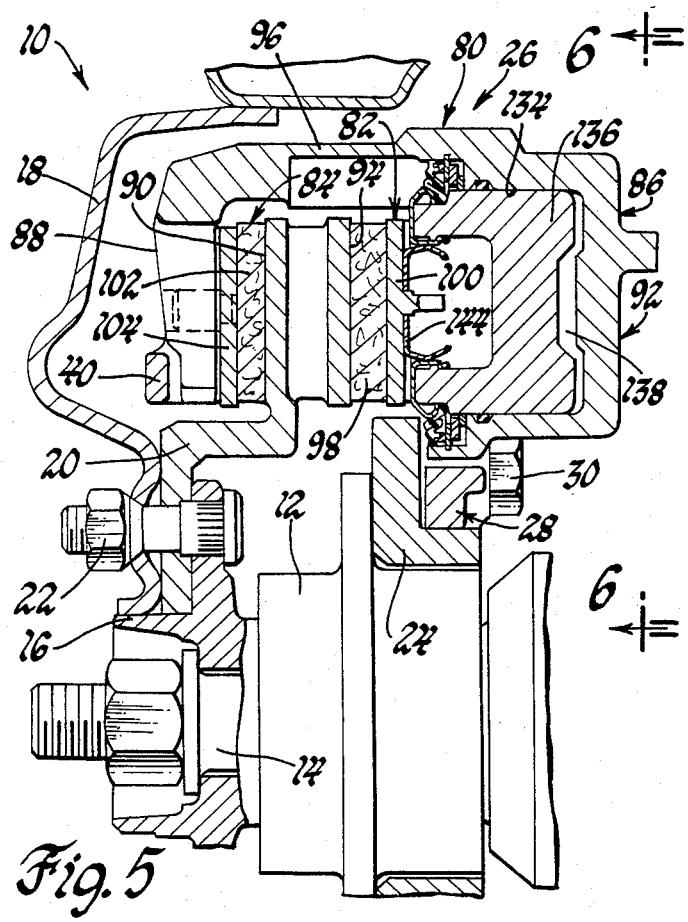
FIG. 5 is a cross-section view, with parts broken away, of another embodiment of the invention.

The vehicle wheel brake assembly 10 is illustrated as being associated with an axle housing 12 through which axle 14 extends. The wheel hub 16 is illustrated as being secured to axle 14 for rotation therewith. Wheel 18 and brake disc 20 are secured to the hub in a suitable well known manner such as by the use of bolt and nut assemblies 22. Since the particular installation shown is part of a front-wheel drive arrangement, the steering knuckle 24 is illustrated as being suitably attached to the axle housing 12. Steering knuckle 24 provides a means for mounting the disc brake assembly 26.

The mounting arrangement includes a fixed mounting bracket 28 secured to steering knuckle 24 by bolts 30. The fixed mounting bracket 28 has a side rail 32 extending between and slightly beyond the bosses through which bolts 30 extend, and upturned ends 34 and 36 are provided on the ends of the side rail. While being described herein as upturned ends, it is recognized that the orientation of the brake assembly may vary. Therefore, this descriptive term is considered to include a generally radially outward extension from the side rail 32 to locations beyond the outer periphery 38 of disc 20. Bracket 28 includes another side rail 40 on the other side of disc 20 from side rail 32. Side rail 40 also has upturned ends 42 and 44. Upturned ends 34 and 42 are cross bar 46. Upturned ends 36 and 44 are similarly connected by a cross bar 48. Torque-taking abutments 50 and 52 are respectively provided on upturned ends 34 and 42. Torque-taking abutments 54 and 56 are similarly provided on upturned ends 36 and 44.

Upturned ends 34 and 36 have recesses 58 and 60 respectively formed therein and extending inwardly toward the center of the vehicle. These recesses accommodate the ends 62 and 64 of the anti-rattle spring 66. The spring body 68 of spring 66 engages a portion of the caliper housing to prevent the housing from rattling relative to the fixed mounting bracket.

The torque-taking abutments are illustrated as being arcuately formed to provide locking means 70 and 72 on upturned ends 34 and 42, and locking means 74 and 76 on upturned ends 36 and 44. As will be later described, the locking means cooperate with the brake shoes to prevent brake shoe movements other than toward and away from the friction brake surfaces of the disc 20.

The caliper assembly 78 includes the caliper housing 80, the inboard brake pad assembly 82 the outboard brake pad assembly 84 and the brake actuator 86. The caliper housing 80 includes an outer leg 88 extending along an arcuate portion of the outer friction braking surface 90 of disc 20, an inboard leg 92 which includes actuator 86 and which extends generally along the inner friction brake surface 94 of disc 20, and a bridge section 96 extending over the disc outer periphery and joining the legs. Inboard brake pad assembly 82 includes a friction material pad 98 attached to a brake shoe 100. The outboard brake pad assembly 84 includes a friction material pad 102 attached to a brake shoe 104. The brake shoes extend across an arcuate portion of the disc friction braking surface and have their ends formed arcuately so as to be received within the locking means. Thus, brake shoe 100 has an arcuate end 106 received within locking means 70 and an arcuate end 108 received within locking means 74. The edge surface of the ends 106 and 108 respectively provide torque-transmitting abutments 110 and 112. Brake shoe 104 has arcuate ends 114 and 116 respectively received within locking means 72 and 76, with the end edge surfaces respectively providing torque-transmitting abutments 118 and 120. Brake pad assembly 84 is illustrated as being mounted on the caliper housing outer leg 88 by means of lugs 122 and 124. The lugs are secured to the brake shoe 104 within apertures 126 and 128 and are secured to the caliper housing outer leg 88 through apertures 130 and 132.

The actuator 86 includes a cylinder 134 formed within the housing inboard leg 92 to reciprocally and sealingly receive piston 136 therein. The piston and cylinder define a pressure chamber 138 into which hydraulic fluid from a master cylinder may be introduced through inlet 140. A suitable bleeding arrangement such as bleeder valve 142 is provided. Piston 136 is movable toward disc 20 when brake actuating pressure is exerted in chamber 138, moving brake pad assembly 82 in the same direction. The brake pad assembly is suitably secured to piston 136 by the mounting means 144. The anti-rattle spring 66 has its spring body 68 extending across the caliper housing as is better seen in FIGS. 3 and 4. It urges the caliper assembly 78 radially inward to minimize rattle.

Figure 6:
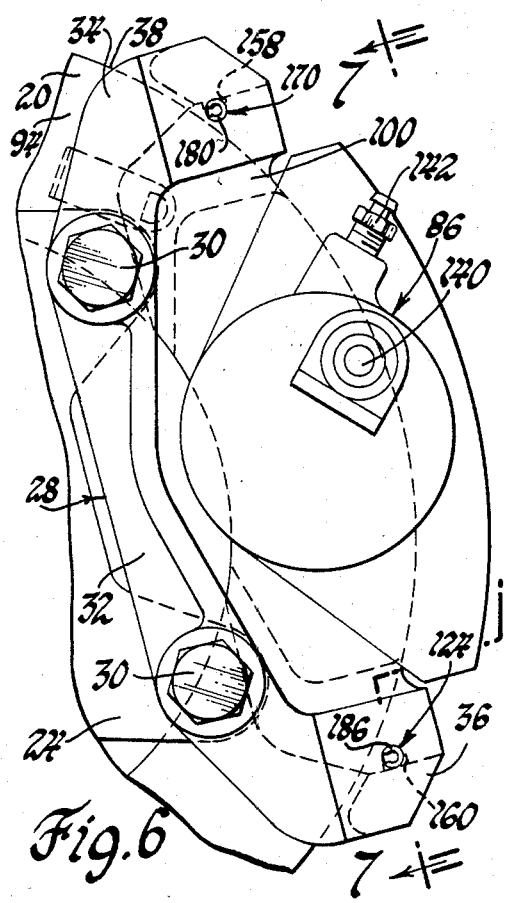
FIG. 6 is an elevation view of the structure of FIG. 5, with parts broken away, and taken in the direction of arrows 6—6 of that Figure.
Figure 7:
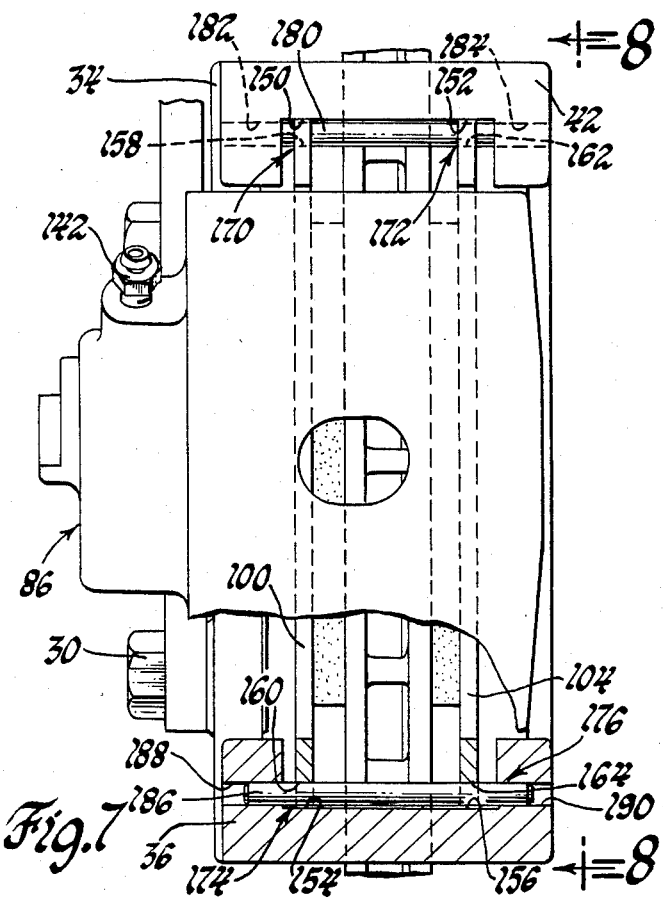
FIG. 7 is a plan view, with parts broken away and in section, of the structure of FIGS. 5 and 6 and taken in the direction of arrows 7—7 of FIG. 6.
Figure 8:
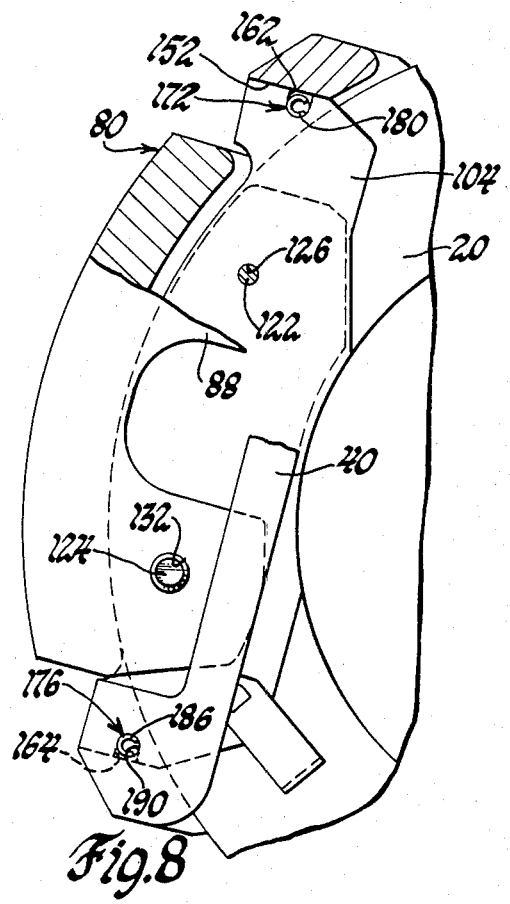
FIG. 8 is an elevation view of the structure of FIGS. 5 through 7, with parts broken away and in section, and taken in the direction of arrows 8—8 of FIG. 7.

The embodiment shown in FIGS. 5 through 8 is quite similar to the embodiment shown in FIGS. 1 through 4, but uses a modified locking means. Therefore, the same reference numerals are applied to comparable structural elements. The modified locking means are identified by reference numerals 170, 172, 174, and 176. The torque-taking abutments 150, 152, 154, and 156 are formed as flat surfaces. The ends of the brake shoes are provided with U-shaped slots 158, 160, 162 and 164 which form parts of the locking means. A roll pin 180 is fitted within apertures 182 and 184 respectively formed in upturned ends 34 and 42 and extends through the slots 158 and 162 of the brake shoes 100 and 104. A similar roll pin 186 is fitted within apertures 188 and 190 formed in upturned ends 36 and 44 and extends through brake shoe slots 160 and 164. Thus the roll pins 180 and 186, the slots 158, 160, 162 and 164 and the apertures 182, 184, 188 and 190 cooperate to define the locking means 170, 172, 174 and 176.

During braking, the inboard lining 98 and outboard lining 102 are pressed against friction braking surfaces 94 and 90, respectively, of disc 20 by hydraulic pressure in chamber 138 acting on piston 136. This results in clamping forces being exerted through the caliper housing 80 and braking torque forces generated by friction between the linings and the disc faces being transmitted linearly through the brake shoes 100 and 104 into fixed mounting bracket 28 and steering knuckle 24 through the shoe ends and the torque-transmitting and torque-taking abutments.

To exchange brake pad assemblies, in the embodiment of FIGS. 1 through 4, bolts 30 are removed. The caliper assembly 78, with mounting bracket 28 and the brake pad assemblies, can then be removed from steering knuckle 24, wheel 18 having first been removed. To replace worn inboard and outboard brake pad assemblies with new ones, the outboard brake shoe 104 is disconnected from the outer leg 88 by moving it toward brake pad assembly 82. It is then removed through disc gap formed in the caliper housing 80 by the caliper legs, and the disc gap extending between the mounting bracket side rails 32 and 40. The inboard brake pad assembly 82 is then disconnected from piston 136 and is also removed through the disc gaps. New brake pad assemblies are installed in the reverse manner and the caliper assembly 78 with mounting bracket 28 is repositioned about disc 20 so that bolts 30 may be reinstalled.

In the embodiment of FIGS. 5 through 8, the same brake action and transmission of forces takes place as in the embodiment of FIGS. 1 through 4. To exchange the brake pad assemblies, roll pins 180 and 186 must be removed. After the wheel 18 has also been removed, the caliper assembly can be lifted out of the mounting bracket 28. After clearing the disc, the worn brake pad assemblies are removed and replaced with new ones. The caliper assembly is then reinstalled in position on the mounting bracket and the roll pins are reinstalled.

In each embodiment the caliper housing is fully mounted to, supported and retained by its respective inboard and outboard brake shoes. The inboard and outboard brake shoes are slidably mounted to, supported, retained and guided by a support structure including the mounting bracket and locking means. All braking torque forces are transmitted directly from the brake pad assemblies into the mounting bracket. The caliper housing in each instance is subjected only to axial clamping forces and no brake torque forces enter it. The outer diameter of the disc can be optimized, restricted only by the bridge thickness of the caliper housing. The number of caliper parts, critical components and sealing and other machined surfaces can be minimized.

The embodiments of the invention in which an exclusive property or privilege is claimed are defined as follows:

1. A disc brake caliper assembly for braking a rotatable disc provided with axially opposite friction braking surfaces having inner and outer peripheries, said caliper assembly comprising:

a fixed bracket forming a mounting saddle defined by opposed side rails having main body portions extending chordaly along either side of an arcuate portion of the disc, said side rails having upturned ends extending beyond and across the disc outer periphery, said upturned ends providing brake shoe torque-taking abutments and including arcuately spaced cross bars joined said side rail main bodies;

opposed brake pad assemblies having friction lining material brake pads positioned along either side of an arcuate portion of the disc friction braking surfaces in friction braking relation thereto, said brake pad assemblies being received within said fixed bracket and having complementary brake torque-transmitting abutments cooperating with said fixed bracket abutments to transmit braking torque to said fixed bracket when the disc brake caliper assembly is actuated;

means forming a part of said fixed bracket and locking said brake pad assemblies within said fixed bracket and permitting sliding brake actuating and release movements of said brake pad assemblies;

a caliper housing having a bridge section extending across the disc outer periphery, opposed leg sections extending along the side of the disc from the bridge section, and a brake actuating and release mechanism in at least one of said legs, said legs operatively engaging said brake pad assemblies in brake actuating and release relation, said caliper housing being received within the saddle formed by said fixed bracket;

and mounting means on either side of the disc friction braking surfaces in alignment with said brake pads, said mounting means mounting one leg section of said caliper housing on one brake pad assembly and the other leg section of said caliper housing on the other brake pad assembly so that said caliper housing is supported on said fixed bracket only by said brake pad assemblies;

and a spring having spring ends slidably received in recesses provided in said fixed bracket upturned ends and a spring center portion engaging one of said caliper housing leg sections to continually urge said caliper housing radially inward and reduce rattle, said spring moving with sliding movements of said caliper housing relative to said fixed bracket.

2. A disc brake caliper assembly for braking a rotatable disc, said caliper assembly comprising:

a fixed bracket forming a mounting saddle defined by opposed side rails having main body portions extending chordally along either side of an arcuate portion of the disc, said side rails having upturned ends extending beyond and across the disc outer periphery, said upturned ends providing brake shoe torque-taking abutments and including arcuately spaced cross bars joining said side rail main bodies;

opposed brake pad assemblies including braking plates and friction lining material brake pads secured to said braking plates, said brake pad assemblies being positioned along either side of an arcuate portion of the disc in friction braking relation thereto, said brake pad assemblies being received within said fixed bracket and having complementary brake torque-transmitting abutments cooperating with said fixed bracket abutments to transmit braking torque to said fixed bracket when the disc brake caliper assembly is actuated;

removable means forming a part of said fixed bracket and extending through said side rail upturned ends across the disc outer periphery and locking said brake pad assemblies within said fixed bracket and permitting sliding brake actuating and release movements of said brake pad assemblies;

a caliper housing having a bridge section extending across the disc outer periphery, opposed leg sections extending along the sides of the disc from the bridge section, and a brake actuating and release mechanism in at least one of said legs, said legs operatively engaging said brake pad assemblies in brake actuating and release relation, said caliper housing being received within the saddle formed by said fixed bracket;

mounting means positioned back of said brake pads and operatively connecting said backing plates to said caliper housing to mount one leg section of said caliper housing on one brake pad assembly and the other leg section of said caliper housing on the other brake pad assembly so that said caliper housing is supported on said fixed bracket only by said brake pad assemblies at points in alignment with said brake pads and the arcuate portion of the disc in friction braking relation with said brake pads.

* * * * *

UNITED STATES PATENT AND TRADEMARK OFFICE
CERTIFICATE OF CORRECTION

PATENT NO. : 4,509,619

DATED : April 9, 1985

INVENTOR(S) : Gene P. Baynes et al

It is certified that error appears in the above-identified patent and that said Letters Patent is hereby corrected as shown below:

Column 4, line 34, Claim 1, "joined" should read -- joining --.

Signed and Sealed this

Thirteenth Day of August 1985

[SEAL]

Attest:

DONALD J. QUIGG

Attesting Officer     Acting Commissioner of Patents and Trademarks